United States Patent [19]
DeYoung et al.

[11] Patent Number: 6,037,684
[45] Date of Patent: Mar. 14, 2000

[54] HVLP MOTOR ASSEMBLY

[75] Inventors: Roger L. DeYoung, Franklin, Tenn.; Gary E. Biddle, Carlisle, Pa.; Stanley D. Neal, Mt. Juliet, Tenn.; Jeffery J. Behnke, Watertown, N.Y.; Kenneth L. Bundy, Theresa, N.Y.; George A. Flaherty, Adams Center, N.Y.

[73] Assignee: Campbell Haufeld/Scott Fetzer Company, Harrison, Ohio

[21] Appl. No.: 09/301,175

[22] Filed: Apr. 28, 1999

[51] Int. Cl.[7] ...................................................... H02K 9/04
[52] U.S. Cl. ................................. 310/58; 310/52; 310/59; 415/211.2; 417/372; 417/423.8
[58] Field of Search .............................. 415/211.2, 199.1; 239/128, 428.5; 417/372, 423.8; 310/52, 58, 59, 60 R, 62, 63

[56] References Cited

U.S. PATENT DOCUMENTS

| | | |
|---|---|---|
| 2,693,312 | 11/1954 | Lanter . |
| 4,234,290 | 11/1980 | Lobach et al. . |
| 4,435,877 | 3/1984 | Berfield . |
| 4,619,588 | 10/1986 | Moore, III . |
| 4,744,516 | 5/1988 | Peterson et al. .......................... 239/128 |
| 4,762,472 | 8/1988 | King . |
| 4,908,538 | 3/1990 | Geberth, Jr. . |
| 5,401,145 | 3/1995 | Bieger et al. . |
| 5,604,654 | 2/1997 | Wille et al. . |
| 5,711,516 | 1/1998 | Van De Venne et al. ............... 416/144 |
| 5,749,704 | 5/1998 | Jerdee .................................... 415/211.2 |

*Primary Examiner*—Nestor Ramirez
*Assistant Examiner*—Burton S. Mullins
*Attorney, Agent, or Firm*—Jones, Day, Reavis & Pogue

[57] ABSTRACT

A motor assembly is disclosed in which a motor is rotationally connected to an impeller for producing a fluid flow, preferably an air flow. A venturi passage is provided for conducting a high velocity air jet from the air flow. A baffle is configured to the venturi passage to draw an air wash over the motor to provide cooling, without a separate cooling fan.

13 Claims, 4 Drawing Sheets

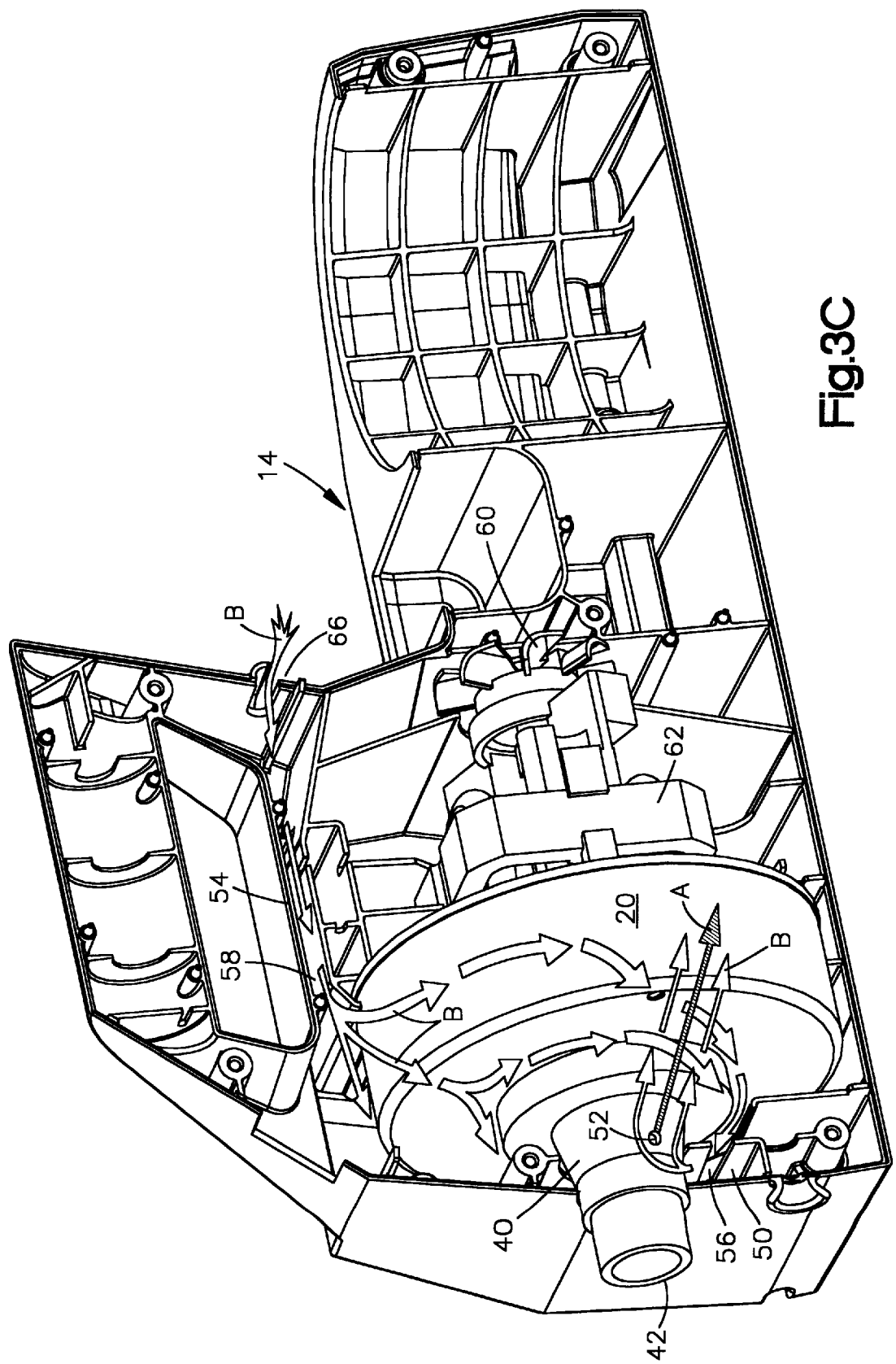

HVLP MOTOR ASSEMBLY

BACKGROUND OF THE INVENTION

The present invention is directed to the field of air turbine motor assemblies, particularly those used for applications requiring high volume and low pressure (HVLP) e.g. paint sprayers and the like. In typical previous HVLP applications, it is common to use a modified vacuum cleaner motor design to create the desired air flow. However, vacuum cleaners require large volume air flow, and such motors are designed for large orifices, such as shop vac hoses and attachments. When such vacuum cleaner motors are coupled to HVLP spray guns having small hose diameters, internal passages and orifices, the resulting flow is significantly decreased, in accordance with the principles of fluid mechanics. Such motors typically operate well outside the range of desirable operating conditions, even at less than 10% efficiency.

In addition to the above-noted efficiency losses, the decreased flow in previous systems creates a back pressure which raises the temperature of the air turbine, causing an increase in charge air temperature to the spray gun, heating up the air hose and even adversely affecting the spray pattern. Some previous systems include a separate cooling fan to draw cooling air over the motor during operation. However, a separate cooling fan alone is not sufficient to cool the charge air to the desired temperature.

SUMMARY OF THE INVENTION

In view of the above-noted drawbacks and deficiencies associated with previous devices, there is therefore a need for an HVLP motor assembly with improved efficiency.

There is also a need for an air motor assembly with reduced charge air temperature.

There is also a need for an HVLP motor assembly with improved air flow characteristics.

These needs and others are satisfied by the present motor assembly in which a motor is rotationally connected to an impeller for producing a fluid flow, preferably an air flow. A venturi passage is provided for conducting a high velocity air jet from the air flow. A baffle is configured to the venturi passage to draw an air wash over the motor to provide cooling, and lower charge air temperature.

As will be appreciated, the invention is capable of other and different embodiments, and its several details are capable of modifications in various respects, all without departing from the invention. Accordingly, the drawings and description are to be regarded as illustrative in nature and not restrictive.

BRIEF DESCRIPTION OF THE DRAWINGS

FIGS. 3A, 3B and 3C are respective top sectional, side sectional and oblique sectional views of the motor assembly and housing of the present invention.

DETAILED DESCRIPTION OF THE INVENTION

Figure 1:
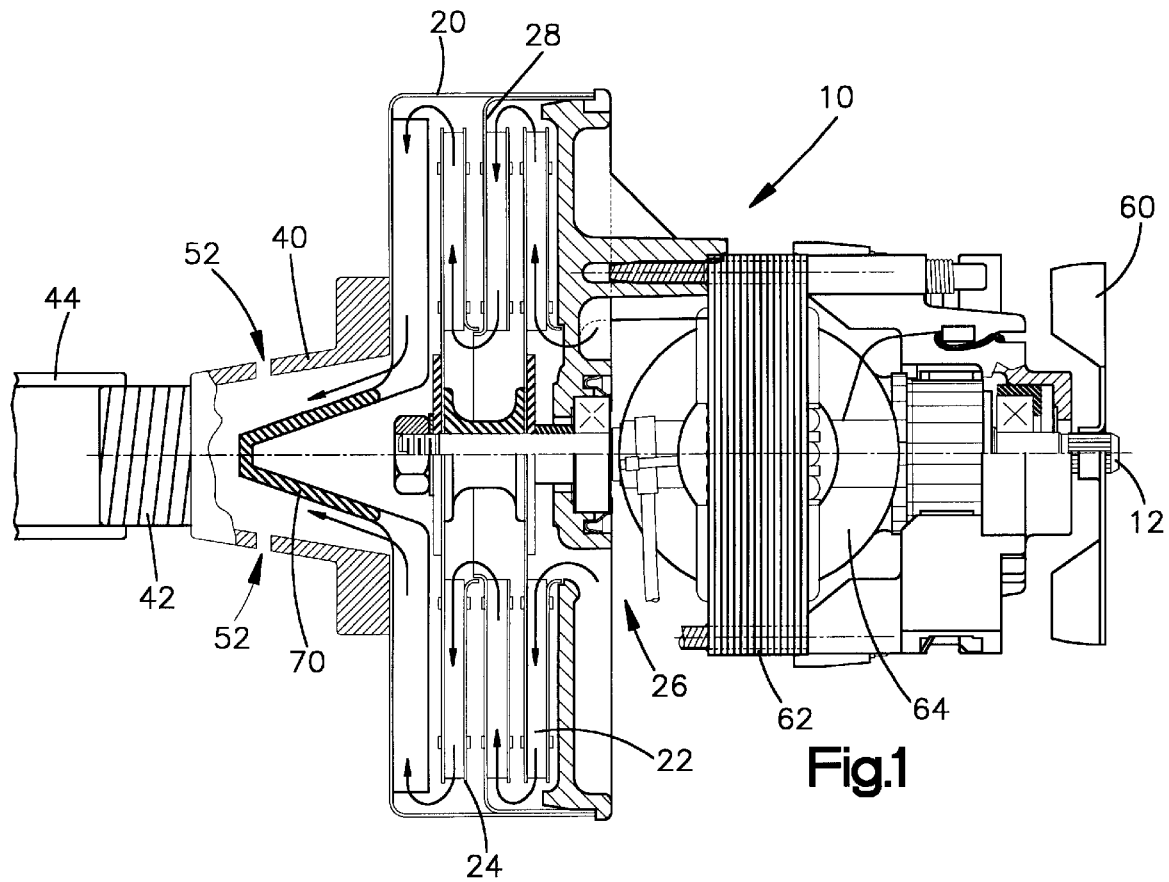
FIG. 1 is a side-sectional view of the motor assembly of the present invention.
Figure 2:
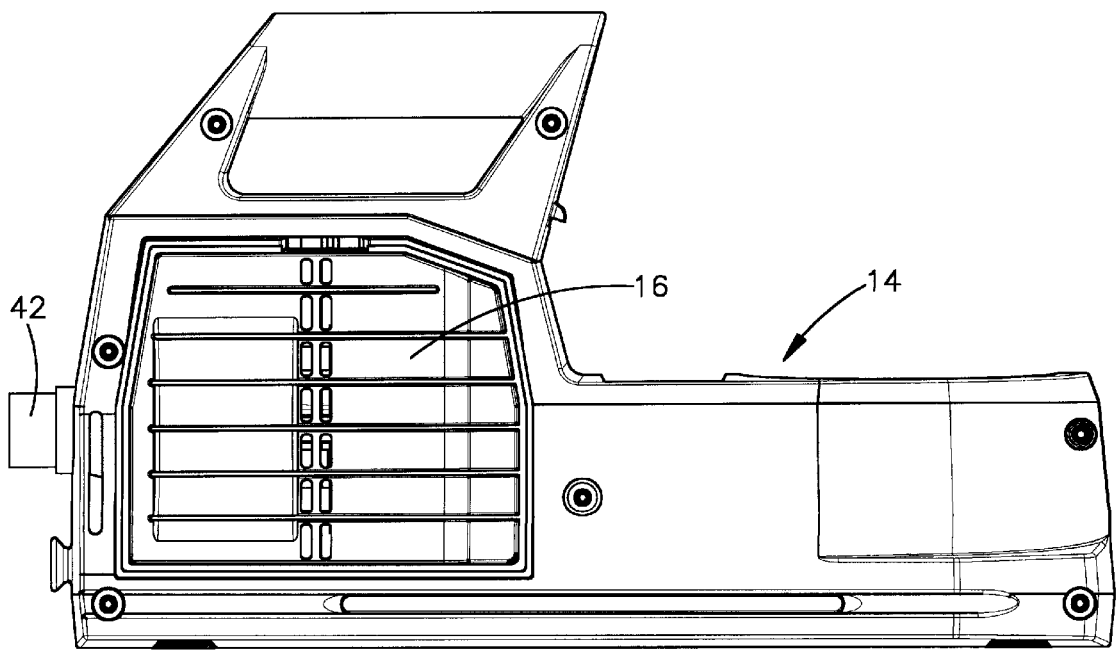
FIG. 2 is a side view showing the housing of the present invention.
Figure 3A:
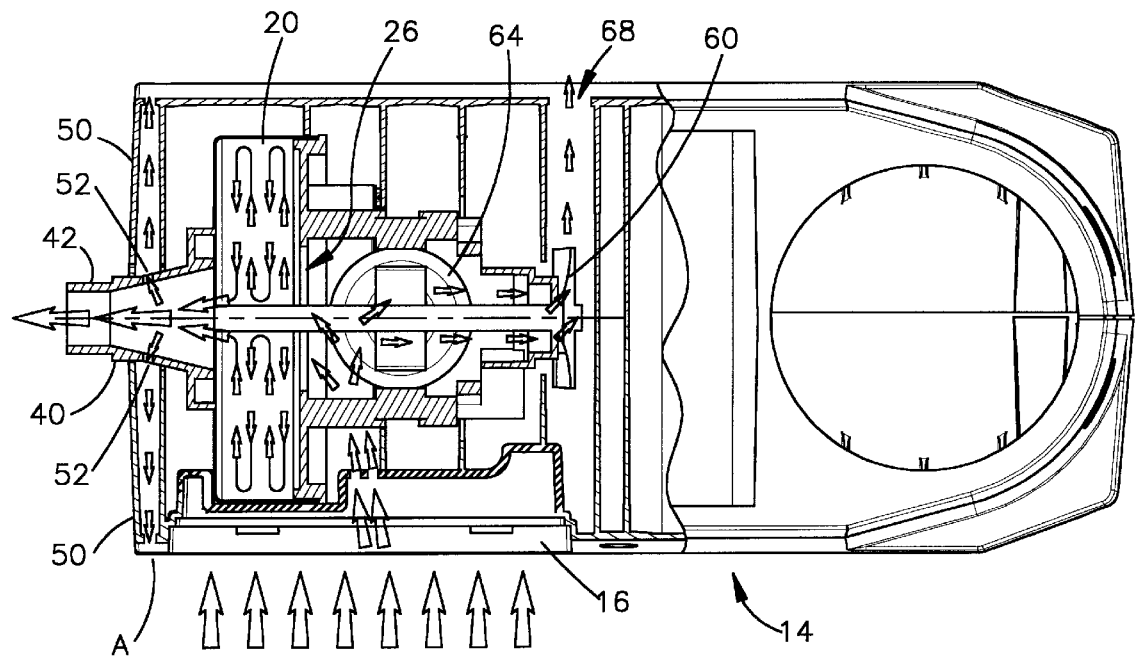
Figure 3B:
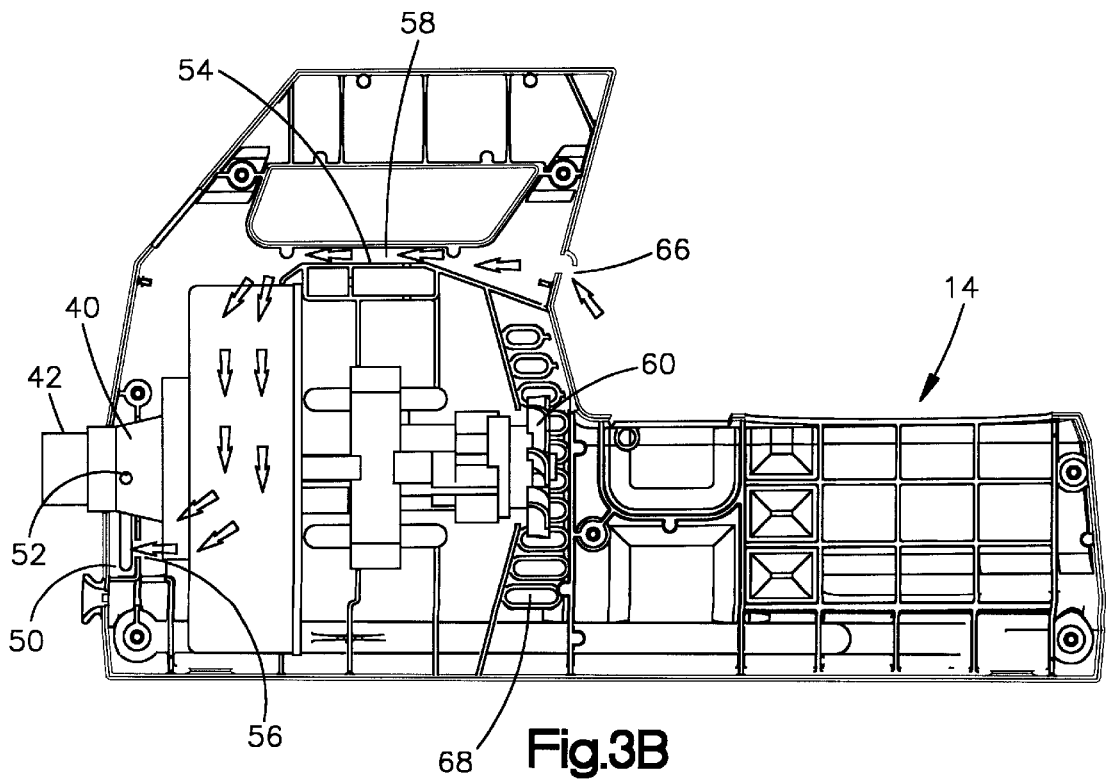

As shown in the figures, where like reference numerals refer to like elements, the present motor assembly includes a motor 10 for producing rotation about an axis 12. The motor 10 is preferably retained within a housing 14 having a filtered housing air intake 16. Further particulars of the housing 14 will be set forth in detail below.

The present motor assembly includes a motor can or turbine chamber 20 which encloses an impeller assembly, rotationally connected to the motor 10 for producing a fluid flow, where the fluid is preferably air. The impeller assembly preferably includes a first stage impeller 22 having an impeller intake 26 and a second stage impeller 24. The impeller assembly draws air through the housing air intake 16, into the impeller intake 26, and admits air to the first stage impeller 22. A first stage collector/redirector 28 directs the air to a second stage impeller 24. The second stage impeller 24 increases the pressure of the air and releases the air to a diffuser collector 70. An outlet 40 receives the air flow from the diffuser/collector 70 and conducts it to a discharge. The outlet 40 is preferably connected to a hose adapter 42, and the discharge is preferably a hose 44 connected to an appliance, preferably a paint sprayer that receives air from the motor assembly at high volume and low pressure.

The present invention relies on a venturi principle for drawing cooling air over the turbine chamber 20. One or more venturi passages 50 (preferably two) are provided for conducting a high velocity air jet (A) from the outlet 40. Preferably, the venturi passages 50 are formed integrally within the housing 14. The outlet 40 is formed with a respective number of venturi bleed holes 52 for admitting an air jet having a specific desired velocity and pressure from the charge air. The venturi passages 50 are fluidly connected to a respective number of baffles 54, which are preferably integrally formed within the housing. The baffles 54 surround the turbine chamber 20 for ducting a cooling air wash (B) received from an intake opening 66, through housing passages 58 and around the turbine chamber 20. As the high velocity air jets (A) pass through the venturi passages 50, they draw the air wash through the housing passages 58, through a venturi passage opening 56, and into the venturi passage 50. This air wash 54 conducts heat away from the turbine chamber 20, thereby lowering the temperature of the charge air. The inventors have observed that with the present invention, the temperature of the charge air is lowered 7–10 degrees (C) over previous devices.

In addition to the venturi passages 50 and housing passages 58 for cooling the turbine chamber 20, the present invention preferably includes a radial flow fan 60, also operating off the motor for cooling the electrical components of the motor 10, i.e. the stator 62 and the field coil 64. The radial flow fan 60 draws cooling air along with the charge air through the housing 14 through the housing air intake 16. A common air flow is divided in a location along the motor axis, near the impeller intake 26, and cooling air is drawn along the axis, through the electrical components 62, 64. The radial flow fan 60 blows the cooling air radially down flow passages defined by baffles, and out of cooling air exhaust vents 68 in the housing 14, thereby cooling the electrical components.

Figure 4A:
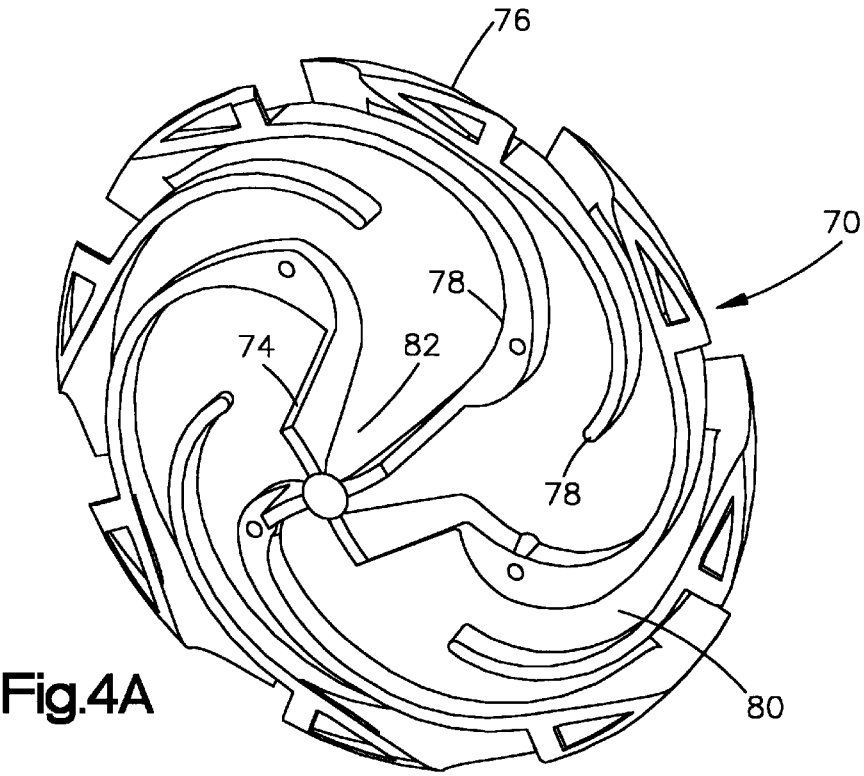
FIGS. 4A, 4B and 4C are respective oblique, side and frontal views of the diffuser of the present invention.
Figures 4B, 4C:
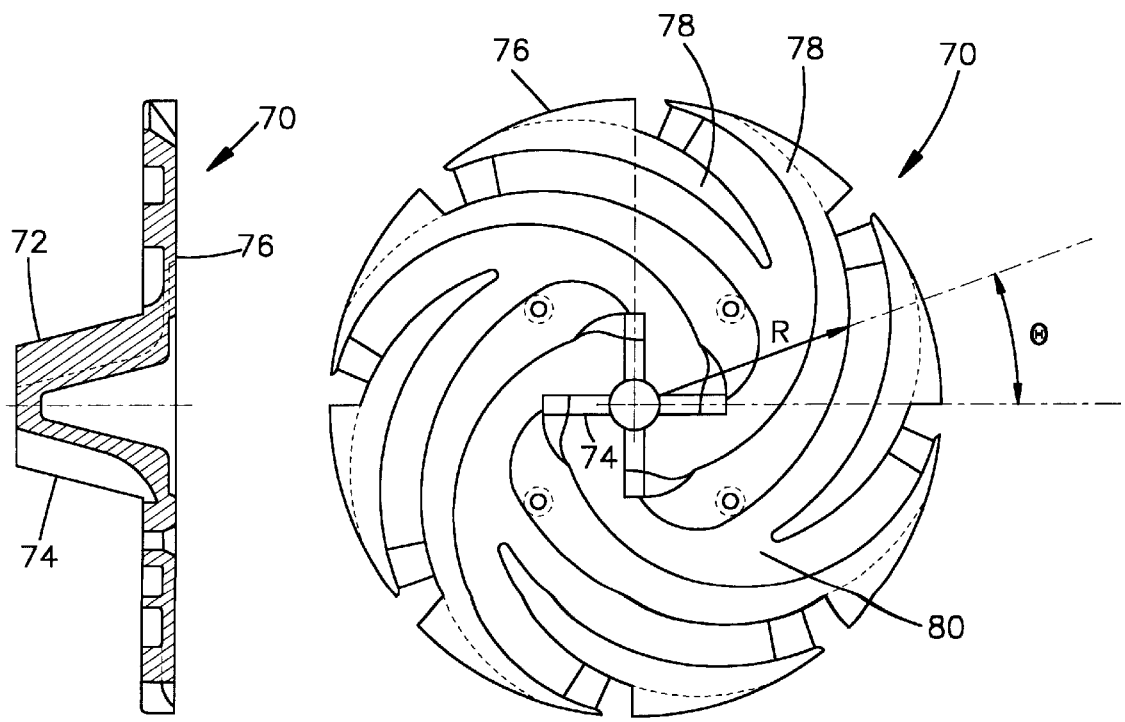

The turbine chamber 20 encloses and entrains the charge air and directs it toward a diffuser collector 70, retained within the outlet 40, which receives the radially-directed flow and channels it in an axial direction. As shown particularly in FIGS. 4A, 4B and 4C, the diffuser 70 has a plurality of vanes that protrude from the surface of the diffuser 70 for reducing turbulence in the air flow. The diffuser 70 includes a tapered portion 72, tapered in an axial direction, preferably generally conical or frusto-conical in configuration.

The tapered portion 72 includes a plurality of axially-extending transitioning vanes 74 defining transitioning vane channels 82, to divert the radial air flow and channel it in an axial direction. The illustrated embodiment shows four axially-extending vanes 74, but any number could be contemplated without departing from the invention. The diffuser 70 is fixedly mounted against rotation to the turbine chamber 20 by a top plate 76, having apertures to receive the air flow from the impeller assembly. The top plate 76 includes a plurality of spiral-shaped vanes 78, preferably eight, for defining a respective number of flow channels 80 therebetween. In the illustrated embodiment, four alternating spiral-shaped vanes 78 terminate at an inward radial position near the axis 12, so as to merge adjoining vane flow channels 80 with minimal turbulence and provide a desired cross-sectional area to maintain the required air flow and pressure. The remaining four spiral-shaped vanes 78 terminate near the four axially-extending transitioning vanes 74 along the tapered portion 72 so as to change the direction of the air flow from radial to axial while straightening the air flow into a substantially laminar flow for supply to the hose 44 and the sprayer.

The diffuser improves the efficiency of the system over previous devices by providing an efficient vane curve for turning the air nonrestrictive ramp angles, lead chamfer and fillets to provide non-turbulent flow passages. The general curvature of the spiral-shaped vanes 78 determine how the rotating velocity air flow head can be recuperated into a pressure head. It has been found that performance and efficiency can be improved by designing the vanes so that the vane radius for a reference vane at a given point varies with an angle along a coordinate reference system of the top plate 76, viewed from the nozzle end, where the coordinate origin is the center of the plate, according to:

$R=A (1-\cos \theta)$ (for clockwise rotation)

$R=A (1+\cos \theta)$ (for counterclockwise rotation)

where R is the radius, $\theta$ is the angle, and A is a constant of proportionality.

The present invention thus provides superior cooling and reduction of turbulence which creates heat. These features provide extended motor life, low spraying temperatures, and extended hose life, which represents improved performance and efficiency. While a two-stage system is shown, with a separate impeller and cooling fan, any number of multiple stages could be contemplated. Also, the present invention could also operate in a single stage, in which cooling is provided without a separate cooling fan, all without departing from the invention. Further, the design can also be adapted for tangential, radial discharge, rather than the axial discharge as disclosed, all without departing from the invention.

As described hereinabove, the present invention solves many problems associated with previous systems, and presents improved efficiency and operability. However, it will be appreciated that various changes in the details, materials and arrangements of parts which have been herein described and illustrated in order to explain the nature of the invention may be made by those skilled in the art within the principle and scope of the invention as expressed by the appended claims.

We claim:

1. A motor assembly comprising:
    a motor for producing rotation about an axis;
    a turbine chamber comprising an impeller, rotationally connected to the motor, for producing a fluid flow;
    at least one baffle, surrounding the turbine chamber, for ducting a cooling fluid wash around the turbine chamber;
    an outlet for receiving the fluid flow from the impeller and conducting it to a discharge;
    at least one venturi passage for conducting a high velocity fluid jet from the outlet, wherein the at least one venturi passage is fluidly connected to the at least one baffle for drawing the fluid wash around the turbine chamber.

2. The motor assembly of claim 1 further comprising a housing for retaining the motor and turbine chamber, wherein the at least one baffle and the at least one venturi passage are integrally formed within the housing.

3. The motor assembly of claim 1 wherein the at least one venturi passage comprises at least one venturi bleed hole formed in the outlet.

4. The motor assembly of claim 1 wherein the fluid is air and the outlet comprises a hose adapter wherein the discharge comprises a hose for delivering air to an appliance.

5. The motor assembly of claim 4 wherein the appliance is a paint sprayer and wherein the motor assembly supplies air at high volume and low pressure.

6. The motor assembly of claim 1 further comprising a diffuser for channeling the fluid flow from the impeller to the outlet, wherein the diffuser comprises at least one vane for reducing turbulence in the fluid flow.

7. The motor assembly of claim 6 wherein the impeller includes an axial aperture for admitting the fluid, and a plurality of radial flow passages for directing the fluid flow in a direction radial to the axis, wherein the diffuser receives and channels fluid flow in an axial direction.

8. The motor assembly of claim 7 wherein the diffuser has a tapered portion tapered in an axial direction.

9. The motor assembly of claim 7 wherein the at lest one vane comprises a plurality of vanes that protrude from the surface of the diffuser including at least one axially-extending transitioning vane along the tapered portion of the diffuser, defining at least one respective transitioning vane channel, to channel the fluid flow in an axial direction.

10. The motor assembly of claim 9 wherein the diffuser includes a generally flat top plate upstream of the tapered portion, wherein the top plate includes a plurality of generally spiral-shaped vanes, defining a respective number of spiral-shaped vane channels therebetween, wherein at least one spiral-shaped vane channel merges with a respective transitioning vane channel along the tapered portion.

11. The motor assembly of claim 10 wherein the plurality of spiral-shaped vanes comprises eight spiral-shaped vanes, wherein four alternating spiral-shaped vanes are terminated at an inward radial position and the respective remaining spiral-shaped vane channels merge with four respective transitioning vane channels.

12. The motor assembly of claim 10 wherein the spiral-shaped vanes have a shape substantially according to:

$R=A (1-\cos \theta)$ (for clockwise rotation)

$R=A (1+\cos \theta)$ (for counterclockwise rotation)

where R is the radius from a center of the top plate, $\theta$ is a reference angle having an origin at the center of the top plate, and A is a constant of proportionality, wherein rotation is viewed facing the outlet.

13. The motor assembly of claim 1 including a radial flow fan for cooling electrical components of the motor.

* * * * *